United States Patent
Baraniuk et al.

(10) Patent No.: US 9,654,752 B2
(45) Date of Patent: May 16, 2017

(54) METHOD AND APPARATUS FOR COMPRESSIVE ACQUISITION AND RECOVERY OF DYNAMIC IMAGERY

(75) Inventors: Richard G. Baraniuk, Houston, TX (US); Aswin C. Sankaranarayanan, Houston, TX (US)

(73) Assignee: William Marsh Rice University, Houston, TX (US)

( * ) Notice: Subject to any disclaimer, the term of this patent is extended or adjusted under 35 U.S.C. 154(b) by 516 days.

(21) Appl. No.: 13/261,543

(22) PCT Filed: Jun. 18, 2011

(86) PCT No.: PCT/US2011/041012
§ 371 (c)(1),
(2), (4) Date: Dec. 21, 2012

(87) PCT Pub. No.: WO2012/044380
PCT Pub. Date: Apr. 5, 2012

(65) Prior Publication Data
US 2013/0093957 A1   Apr. 18, 2013

Related U.S. Application Data

(60) Provisional application No. 61/356,410, filed on Jun. 18, 2010.

(51) Int. Cl.
*H04N 5/228* (2006.01)
*H04N 9/67* (2006.01)
(Continued)

(52) U.S. Cl.
CPC ............... *H04N 9/67* (2013.01); *G06T 9/00* (2013.01); *H04N 19/90* (2014.11)

(58) Field of Classification Search
CPC ......... G06T 11/60; G06T 9/00; H06F 17/153; H04N 5/225; H04N 19/90; H04N 5/228
(Continued)

(56) References Cited

U.S. PATENT DOCUMENTS 7,271,747 B2   9/2007   Baraniuk et al.
7,511,643 B2   3/2009   Baraniuk et al.
(Continued)

OTHER PUBLICATIONS

Cand'es, J. Romberg, and T. Tao, "Robust uncertainty principles: Exact signal reconstruction from highly incomplete frequency information", in IEEE Transactions on information theory, vol. 52 (2006) 489-509.
(Continued)

*Primary Examiner* — Tuan Ho
*Assistant Examiner* — Zhenzhen Wu
(74) *Attorney, Agent, or Firm* — 24IP Law Group; Timothy R DeWitt

(57) ABSTRACT

A new framework for video compressed sensing models the evolution of the image frames of a video sequence as a linear dynamical system (LDS). This reduces the video recovery problem to first estimating the model parameters of the LDS from compressive measurements, from which the image frames are then reconstructed. We exploit the low-dimensional dynamic parameters (state sequence) and high-dimensional static parameters (observation matrix) of the LDS to devise a novel compressive measurement strategy that measures only the dynamic part of the scene at each instant and accumulates measurements over time to estimate the static parameters. This enables us to lower the compressive measurement rate considerably yet obtain video recovery at a high frame rate that is in fact inversely proportional to the length of the video sequence. This property makes our framework well-suited for high-speed video capture and other applications. We validate our approach with a range of experiments including classification experiments that highlight the purposive nature of our framework.

9 Claims, 11 Drawing Sheets

Figure 1:
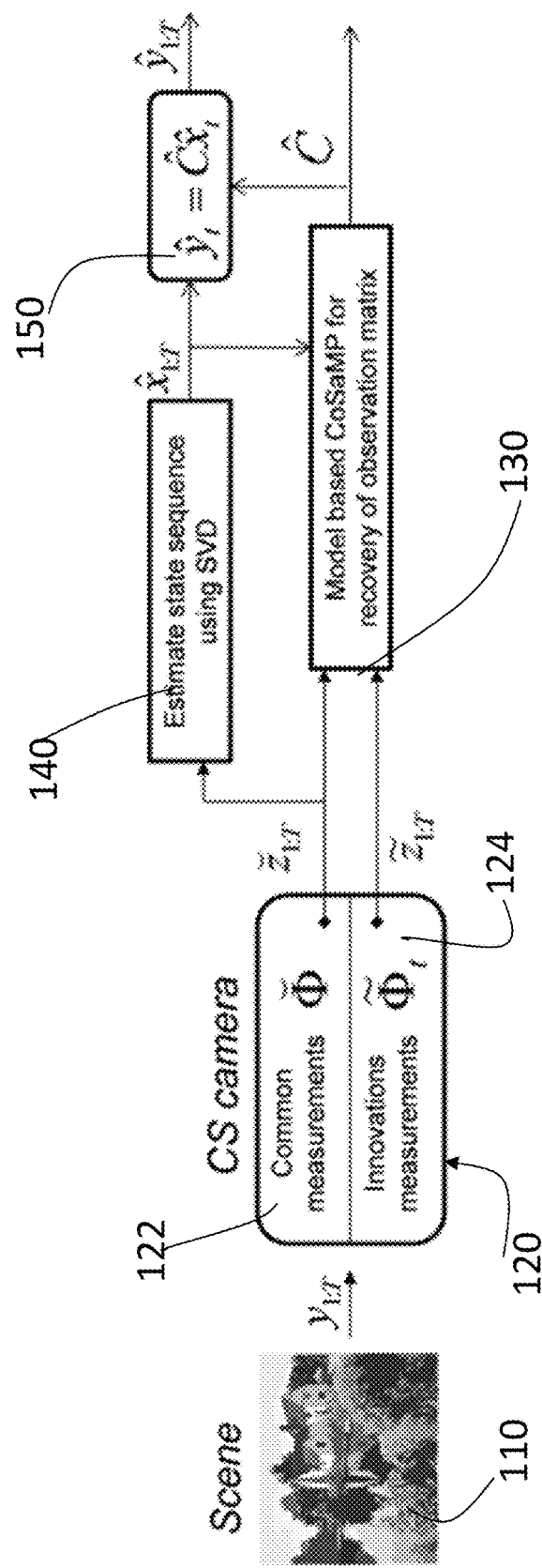

(51) Int. Cl.
  *G06T 9/00* (2006.01)
  *H04N 19/90* (2014.01)
(58) Field of Classification Search
  USPC .......... 348/222.1, 239, 207.99, 418.1, 420.1;
  382/276, 278; 341/50, 51
  See application file for complete search history.

(56) References Cited

U.S. PATENT DOCUMENTS

| | | | |
|---|---|---|---|
| 2006/0029279 | A1 | 2/2006 | Donoho |
| 2006/0038705 | A1* | 2/2006 | Brady et al. ..................... 341/13 |
| 2006/0239336 | A1* | 10/2006 | Baraniuk et al. ............. 375/216 |
| 2006/0261244 | A1* | 11/2006 | Topa ......................... G01J 9/00 250/201.9 |
| 2008/0129560 | A1* | 6/2008 | Baraniuk et al. ................ 341/87 |
| 2008/0159590 | A1* | 7/2008 | Yi ........................ G06F 17/3079 382/103 |
| 2008/0273588 | A1* | 11/2008 | Wang ............................ 375/240 |
| 2010/0260439 | A1* | 10/2010 | Vidal et al. ................... 382/294 |
| 2010/0306290 | A1* | 12/2010 | Zhang et al. ................. 708/205 |

OTHER PUBLICATIONS

D. Donoho,"Compressed sensing," in IEEE Transactions on Information Theory, vol. 52 (2006) 1289-1306.
R. Baraniuk, M. Davenport, R. DeVore and M. Wakin, "A simple proof of the restricted isometry property for random matrices," in Constructive Approximation, vol. 28 (2008) 253-263.
J. Haupt, and R. Nowak, "Signal reconstruction from noisy random projections," IEEE Transactions on Information Theory, vol. 52 (2006) 4036-4048.
E. van den Berg, and M. P. Friedlander, "Probing the pareto frontier for basis pursuit solutions.," SIAM Journal on Scientific Computing, vol. 31 (2008) 890-912.
Y. C. Pati, R. Rezaiifar and P. S. Krishnaprasad, "Orthogonal matching pursuit: Recursive function approximation with applications to wavelet decomposition," in Asilomar Conference on Signals, Systems and Computers, vol. 1. (1993) 40-44.
D. Needell, and J. Tropp, "CoSaMP: Iterative signal recovery from incomplete and inaccurate samples," in Applied and Computational Harmonic Analysis, vol. 26 (2009) 301-321.
A. Wagadarikar, R. John, R. Willett and D. Brady, "Single disperser design for coded aperture snapshot spectral imaging," in Applied Optics, vol. 47 (2008) 44-51.
M. Duarte, M. Davenport, D. Takhar, J. Laska, T. Sun, K. Kelly, and R. Baraniuk, "Single-pixel imaging via compressive sampling," in IEEE Signal Processing Magazine, vol. 25 (2008) 83-91.
M. Wakin, J. Laska, M. Duarte, D. Baron, S. Sarvotham, D.Takhar, K. Kelly, R. Baraniuk, Compressive imaging for video representation and coding, in 5 Picture Coding Symposium, (2006).
J. Park and M. Wakin, "A multiscale framework for compressive sensing of video," in Picture Coding Symposium, (2009).
N. Vaswani, "Kalman filtered compressed sensing," in IEEE International Conference on Image Processing, (2008).
N. Vaswani and W. Lu, "Modified-CS: Modifying compressive sensing for problems with partially known support," in Intl. Symposium on Information Theory, (2009).
V. Cevher, A. Sankaranarayanan, M. Duarte, D. Reddy, R. Baraniuk and R. Chellappa, "Compressive sensing for background subtraction," in European Conference on Computer Vision, Springer (2008) 12-18.
J. Zheng and E. Jacobs, "Video compressive sensing using spatial domain sparsity", in Optical Engineering, vol. 48 (2009) 087006.
A. Veeraraghavan, D. Reddy, and R. Raskar, "Coded strobing photography: Compressive sensing of high-speed periodic events," in IEEE Trans. on Pattern Analysis and Machine Intelligence ((to appear), URL:http://www.cfar.umd.edu/users/vashok).
G. Doretto, A. Chiuso, Y. Wu, and S. Soatto, "Dynamic textures," in International Journal of Computer Vision, vol. 51 (2003) 91-109.
A. B. Chan and N. Vasconcelos,"Probabilistic kernels for the classification of auto-regressive visual processes," in IEEE Cont. on Computer Vision and Pattern Recognition, (2005) 846-851.
A. Veeraraghavan, A. K. Roy-Chowdhury, and R. Chellappa,"Matching shape sequences in video with applications in human movement analysis," in IEEE Transactions on Pattern Analysis and Machine Intelligence, vol. 27 (2005) 1896-1909.
P. Turaga, A. Veeraraghavan, and R. Chellappa, "Unsupervised view and rate invariant clustering of video sequences," Computer Vision and Image Understanding vol. 113 (2009) 353-371.
R. G. Baraniuk, V. Cevher, M. F. Duarte and C. Hegde,"Model-based compressive sensing," CoRR vol. abs/0808.3572 (2008).

\* cited by examiner

M/N: 0.25%
Input SNR: 10dB

M/N: 0.19%
Input SNR: 10dB

M/N: 0.19%
Input SNR: 30dB

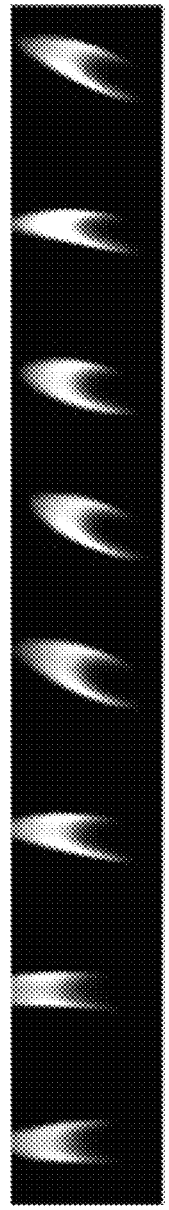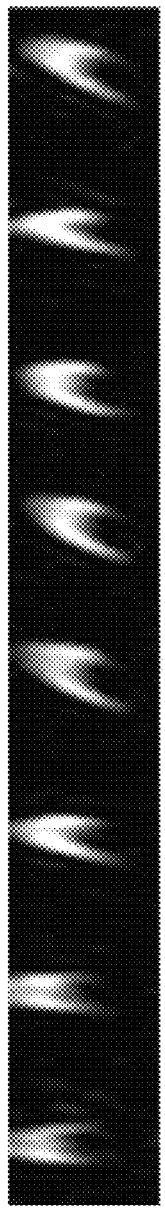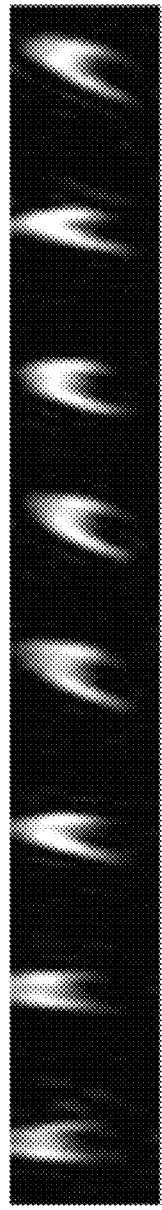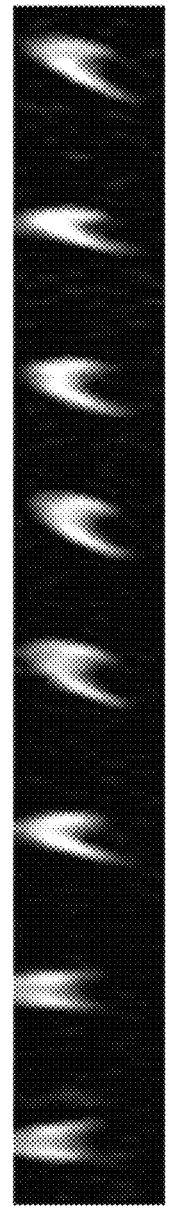
Figure 9A: Ground truth
Figure 9B: $f_x = 256$ Hz, $M = 30$, $\tilde{M} = 170$, Meas. Rate: 5%, SNR 13.73 dB
Figure 9C: $f_x = 512$ Hz, $M = 30$, $\tilde{M} = 70$, Meas. Rate: 2.44%, SNR 13.73 dB
Figure 9D: $f_x = 1024$ Hz, $M = 30$, $\tilde{M} = 20$, Meas. Rate: 1.22%, SNR 12.63 dB

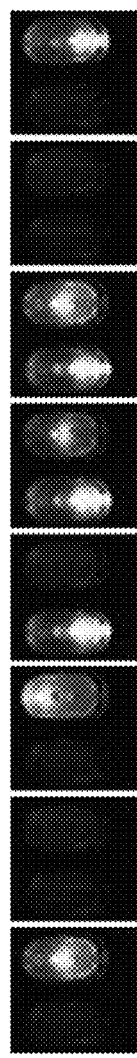
Figure 10A: Ground truth frames
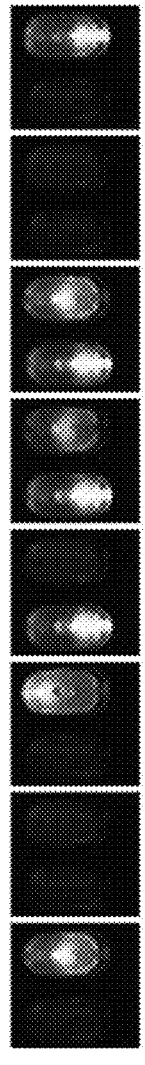
Figure 10B: Oracle SVD frames, Reconstruction SNR = 27 dB
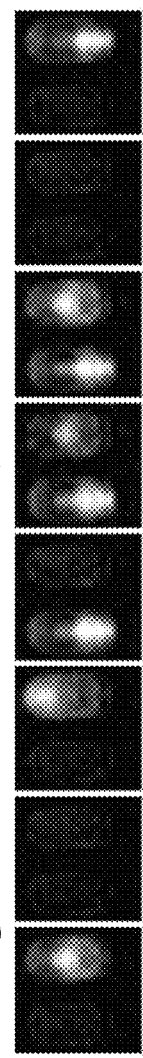
Figure 10C: CS-LDS reconstructed frames, Reconstruction SNR = 15 dB
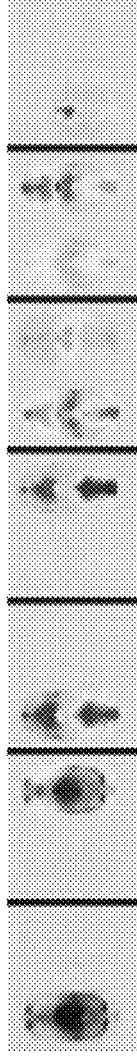
Figure 10D: Ground truth observation Matrix $C$
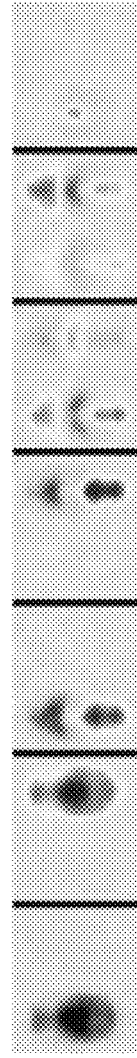
Figure 10E: CS-LDS estimated observation Matrix $\check{C}$

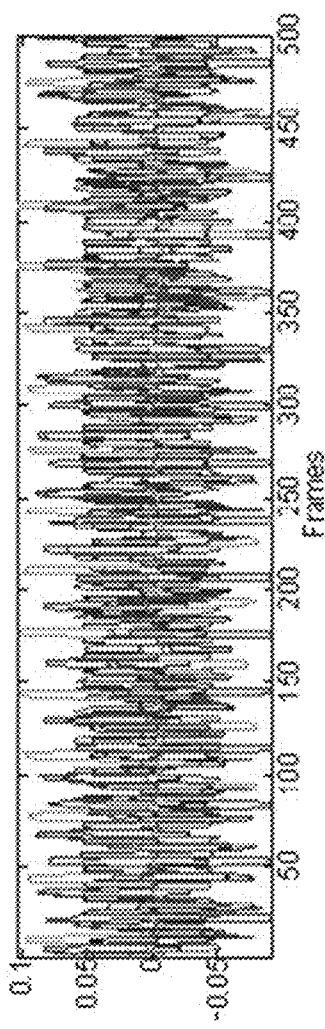
Figure 10F: Ground truth observation Matrix C
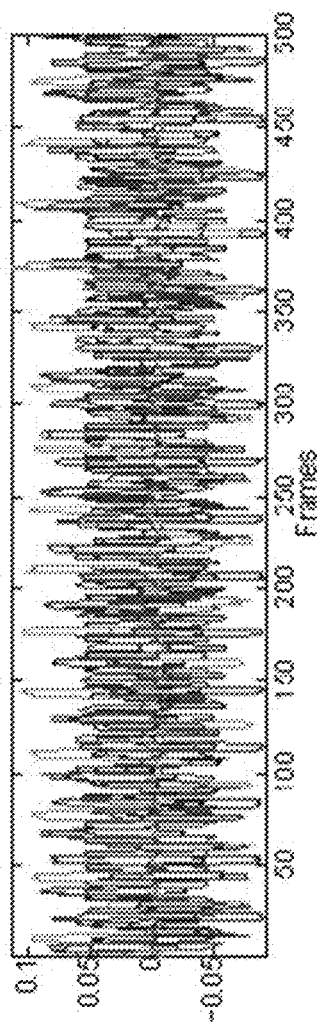
Figure 10G: CS-LDS estimated observation Matrix Ĉ

METHOD AND APPARATUS FOR COMPRESSIVE ACQUISITION AND RECOVERY OF DYNAMIC IMAGERY

CROSS-REFERENCE TO RELATED APPLICATIONS

The present application claims the benefit of the filing date of U.S. Provisional Patent Application Ser. No. 61/356,410 filed by the present inventors on Jun. 18, 2010.

STATEMENT REGARDING FEDERALLY SPONSORED RESEARCH OR DEVELOPMENT

The present invention was made with government support under Contract No. N-000140911162 awarded by the Office of Naval Research. The government has certain rights in the invention

1 BACKGROUND OF THE INVENTION

1.1 Field of the Invention

The present invention relates to methods and apparatus for the acquisition of time-varying signals such as video sequences using compressive measurements and a dynamical system model for the evolution of the data. The invention further relates to methods that exploit the signal measurements and the dynamical system model for the purpose of performing a further processing step including but not limited to detection, classification, estimation, reconstruction, or other information exploitation. The invention is applicable to all types of signals and data, including but not limited to signals, images, video and other higher-dimensional data. In particular, the invention is applicable to highly correlated data that exhibits subspace structure such as hyper-spectral data and reflectance fields.

1.2 Brief Description of the Related Art

1.2.1 Compressive Sensing

Consider a signal $y \in \mathbb{R}^N$, which is K-sparse in a basis $\Psi$, that is, $s \in \mathbb{R}^N$, defined as $s = \Psi^T y$, has at most K non-zero components. The signal y could be of any dimension, i.e., a one-dimensional (1D) time signal, a 2D image, a 3D video sequence, a 3D hyperspectral data cube, a 4D hyperspectral video sequence, and so on. Compressive sensing (see E. Candès, J. Romberg, and T. Tao, "Robust uncertainty principles: Exact signal reconstruction from highly incomplete frequency information", in *IEEE Transactions on information theory*, vol. 52 (2006) 489-509; D. Donoho, "Compressed sensing," in *IEEE Transactions on Information Theory*, vol. 52 (2006) 1289-1306) deals with the recovery of y from dimensionality reduced linear measurements of the form $z = \Phi y = \Phi \Psi s$, where $\Phi \in \mathbb{R}^{M \times N}$ is the measurement matrix. For M<N (corresponding to dimensionality reduction), estimating y from the measurements z is an ill-conditioned problem. By exploiting the sparsity of s, the CS theory demonstrates that the signal y can be recovered exactly from $M = O(K \log(N/K))$ measurements provided the matrix $\Phi \Psi$ satisfies the so called restricted isometry property (RIP) (see R. Baraniuk, M. Davenport, R. DeVore and M. Wakin, "A simple proof of the restricted isometry property for random matrices," in *Constructive Approximation*, vol. 28 (2008) 253-263).

In practical scenarios, where there is noise in the signal y or the measurements z, the signal s (or equivalently, y) can be recovered from z by solving a convex problem of the form $$\min \|s\|_1 \text{ subject to } \|z - \Phi \Psi s\| \leq \epsilon \quad (1)$$

with $\epsilon$ a bound on the measurement noise. It can be shown that the solution to (1) is with high probability the K-sparse solution that we seek. The theoretical guarantees of CS have been extended to compressible signals (see J. Haupt, and R. Nowak, "Signal reconstruction from noisy random projections," *IEEE Transactions on Information Theory*, vol. 52 (2006) 4036-4048). In a compressible signal, the sorted coefficients decay rapidly according to a power-law.

There exist a wide range of algorithms that solve (1) under various approximations or reformulations (see E. Candès, J. Romberg, and T. Tao, "Robust uncertainty principles: Exact signal reconstruction from highly incomplete frequency information", in *IEEE Transactions on information theory*, vol. 52 (2006) 489-509; E. van den Berg, and M. P. Friedlander, "Probing the pareto frontier for basis pursuit solutions," *SIAM Journal on Scientific Computing*, vol. 31 (2008) 890-912). It is also possible to solve (1) efficiently using greedy techniques such as Orthogonal Matching Pursuit (see Y. C. Pati, R. Rezaiifar and P. S. Krishnaprasad, "Orthogonal matching pursuit: Recursive function approximation with applications to wavelet decomposition," in *Asilomar Conference on Signals, Systems and Computers*, Volume 1. (1993) 40-44) and CoSAMP (see D. Needell, and J. Tropp, "CoSaMP: Iterative signal recovery from incomplete and inaccurate samples," in *Applied and Computational Harmonic Analysis*, vol. 26 (2009) 301-321). In particular, CoSAMP is a lucrative alternative to convex optimization methods given its strong convergence properties and low computational complexity. It is also easy to impose structural constraints such as block sparsity into CoSAMP giving variants such as model-based CoSAMP (see R. G. Baraniuk, V. Cevher, M. F. Duarte and C. Hegde, "Model-based compressive sensing," *CoRR* vol. abs/0808.3572 (2008)).

1.2.2 Video Compressive Sensing

In video CS, we are interested in acquiring and recovering a video sequence (without loss of generality with two spatial dimensions and one time dimension) of a scene that has dynamic elements. Existing methods for video CS work under the assumption of the availability of multiple measurements at each time instant. To date, such measurements have been obtained using a snapshot imager (see A. Wagadarikar, R. John, R. Willett and D. Brady, "Single disperser design for coded aperture snapshot spectral imaging," in *Applied Optics*, vol. 47 (2008) 44-51) or by stacking consecutive measurements from a single pixel camera (SPC) (see M. Duarte, M. Davenport, D. Takhar, J. Laska, T. Sun, K. Kelly, and R. Baraniuk, "Single-pixel imaging via compressive sampling," in *IEEE Signal Processing Magazine*, vol. 25 (2008) 83-91). Given such a sequence of compressive measurements, reconstruction of the video can be achieved in multiple ways. Wakin et al. (see M. Wakin, J. Laska, M. Duarte, D. Baron, S. Sarvotham, D. Takhar, K. Kelly, R. Baraniuk, "Compressive imaging for video representation and coding, in *Picture Coding Symposium*, (2006)) use a 3D wavelet transform as the sparsifying basis $\Psi$ for recovering videos from snapshots of compressive measurements. Park and Wakin (see J. Park and M. Wakin, "A multiscale framework for compressive sensing of video," in *Picure Coding Symposium*, (2009)) use a coarse-to-fine estimation framework wherein the video, reconstructed at a coarse level, is used to estimate motion vectors that are subsequently used to design dictionaries for reconstruction at a finer level. Vaswani (see N. Vaswani, "Kalman filtered compressed sensing," in *IEEE International Conference on Image Processing*, (2008)) and Vaswani and Lu (see N. Vaswani and W. Lu, "Modified-CS: Modifying compressive sensing for problems with partially known support," in *Intl. Symposium on Information Theory*, (2009)) propose a sequential framework that exploits the similarity of support and the value the signal takes in this support between adjacent frames of a video. A frame of video is reconstructed using a linear inversion over the support at the previous time instant, and a small-scale CS recovery over the residue. All of these algorithms require a large number of measurements at each time instant and in most cases, the number of measurements is proportional to the sparsity of an individual frame. This could potentially be a limiting factor in many applications (where sensing is costly).

Video CS is related to the background subtraction problem, where the idea is to estimate only the dynamic components of a scene. Cevher et al. (see V. Cevher, A. Sankaranarayanan, M. Duarte, D. Reddy, R. Baraniuk and R. Chellappa, "Compressive sensing for background subtraction," in *European Conference on Computer Vision*, Springer (2008) 12-18) and Zheng and Jacobs (see J. Zheng and E. Jacobs, "Video compressive sensing using spatial domain sparsity", in *Optical Engineering*, vol. 48 (2009) 087006) model a video as a static scene with canonically sparse innovations. Veeraraghavan et al. (see A. Veeraraghavan, D. Reddy, and R. Raskar, "Coded strobing photography: Compressive sensing of high-speed periodic events," in *IEEE Trans. on Pattern Analysis and Machine Intelligence* ((to appear), URL: http://www.cfar.umd.edu/users/vashok)) propose a compressive sensing framework of periodic scenes using coded strobing techniques.

1.2.3 Dynamic Textures and Linear Dynamical Systems

Linear dynamical systems (LDS) are a class of parametric models for time-series data of any dimension. A wide variety of spatio-temporal data have often been modeled as realizations of LDS. In particular, they have been used to model, synthesize and classify dynamic textures (see G. Doretto, A. Chiuso, Y. Wu, and S. Soatto, "Dynamic textures," in *International Journal of Computer Vision*, vol. 51 (2003) 91-109), traffic scenes (see A. B. Chan and N. Vasconcelos, "Probabilistic kernels for the classification of auto-regressive visual processes," in *IEEE Conf. on Computer Vision and Pattern Recognition*, (2005) 846-851), and human activities (see A. Veeraraghavan, A. K. Roy-Chowdhury, and R. Chellappa, "Matching shape sequences in video with applications in human movement analysis," in *IEEE Transactions on Pattern Analysis and Machine Intelligence*, vol. 27 (2005) 1896-19092005, P. Turaga, A. Veeraraghavan, and R. Chellappa, "Unsupervised view and rate invariant clustering of video sequences," *Computer Vision and Image Understanding* vol. 113 (2009) 353-371). Let $\{y_t, t=0, \ldots, T\}$ be a sequence of frames/observations indexed by time t. The LDS model parameterizes the evolution of $y_t$ as follows:

$$y_t = Cx_t + w_t, \ w_t \sim N(0,R), \ R \in \mathbb{R}^{N \times N} \quad (2)$$

$$x_{t+1} = Ax_t + v_t, \ v_t \sim N(0,Q), \ Q \in \mathbb{R}^{d \times d} \quad (3)$$

where $x_t \in \mathbb{R}^d$ is the hidden state vector, $A \in \mathbb{R}^{d \times d}$ the transition matrix, and $C \in \mathbb{R}^{N \times d}$ the observation matrix.

Given the observations $\{y_t\}$, the truncated SVD of the matrix $[y]_{1:T} = [y_1, y_2, \ldots, y_T]$ can be used to recover both C and A. In particular, an estimate of the observation matrix C is given as $\hat{C} = U$, where $[y]_{1:T} \approx U\Sigma V^T$ is the rank-d-approximation/truncated SVD. Note that the choice of C is unique only up to a d×d linear transformation. That is, given $[y]_{1:T}$, we can define $\hat{C} = UL$, where L is an invertible d×d matrix. This represents our choice of coordinates in the subspace defined by the columns of C.

2 SUMMARY OF THE INVENTION

Recent advancements in the field of compressive sensing (CS) (see E. Candès, J. Romberg, and T. Tao, "Robust uncertainty principles: Exact signal reconstruction from highly incomplete frequency information", in *IEEE Transactions on information theory*, vol. 52 (2006) 489-509) have led to the development of imaging devices that sense at measurement rates far lower than the Nyquist rate. CS exploits the property that the sensed signal is often sparse in some transform basis to recover it from a small number of linear, random, multiplexed measurements. Robust signal recovery is possible from a number of measurements that is proportional to the sparsity level of the signal, as opposed to its ambient dimensionality. For example, U.S. Patent Publication No. 2006/0239336, entitled "Method and Apparatus for Compressive Imaging Device," disclosed a digital image/video camera that directly acquires random projections of the incident light field without first collecting the pixels/voxels. While there has been substantial progress for CS of static signals such as images, its application to sensing of videos (defined as a sequence of images referred to as frames of the video) has been rather limited. Yet, video CS makes a compelling application with potential for dramatically reducing sensing costs as well as the subsequent data deluge problems faced in the processing and storage of videos.

In the present application, predictive/generative signal models for video CS that are characterized by static parameters are used. Predictive modeling provides a prior for the evolution of the video in both forward and reverse time. By relating the video frames over small durations, predictive modeling helps to reduce the number of measurements required at a given time instant. In particular, such models are defined by two sets of parameters: a high dimensional static parameter (by definition, is constant) and a low dimensional dynamic parameter that changes frame-to-frame. At each time instant, it is only necessary to sense at the rate of the dynamic component of the scene, which can be significantly lower than the sparsity of an individual frame of the video. Under such a model, all measurements (i.e., the measurements taken at all time instants) contribute towards estimation of static parameters.

One dynamic scene model that exhibits predictive modeling as well as high dimensional static parameters is the linear dynamical system (LDS). In this application, new theory, methods, and an apparatus are disclosed for the CS of dynamic scenes modeled as LDS motivated, in part, by the extensive use of such models in characterizing dynamic textures (see G. Doretto, A. Chiuso, Y. Wu, and S. Soatto, "Dynamic textures," in *International Journal of Computer Vision*, vol. 51 (2003) 91-109), matching shape sequences (see A. Veeraraghavan, A. K. Roy-Chowdhury, and R. Chellappa, "Matching shape sequences in video with applications in human movement analysis," in *IEEE Transactions on Pattern Analysis and Machine Intelligence*, vol. 27 (2005) 1896-1909), activity modeling and video clustering (see P. Turaga, A. Veeraraghavan, and R. Chellappa, "Unsupervised view and rate invariant clustering of video sequences," *Computer Vision and Image Understanding* vol. 113 (2009) 353-371).

In a preferred embodiment, the present invention is a method for capturing a video sequence using a architecture such as a single pixel camera. The method comprises the steps of obtaining common measurements of the video sequence, wherein for the common measurements a corresponding measurement matrix is the same at each time instant; obtaining innovations measurements of the video sequence, wherein for the innovation measurements a corresponding measurement matrix is different at each time instant; and estimating a state sequence up to a linear transformation using an SVD of the common measurements. The method may further comprise the step of estimating an observation matrix using the innovation measurements. Still further, the method my comprise the step of recovering an estimate of the video sequence from a product of the observation matrix and the state sequence.

In another preferred embodiment, the present invention is a method for capturing a video sequence that is comprised of the steps of modeling the evolution of image frames of the video sequence as a linear dynamical system, estimating model parameters of the linear dynamical system model from compressive measurements of the video sequence, and reconstructing image frames of the video sequence from the linear dynamical system model and the estimated parameters.

The present invention is also capable of other and different embodiments including those not restricted to videos. In particular, much of ideas apply to a larger class of imagery. In particular, in another preferred embodiment, the present invention is a method for efficient acquisition of correlated data sequences. Instances of this, include hyper-spectral data where the correlation is across the frequency bands of sensing; hyper-spectral video where additional redundancy and correlation is introduced by the temporal smoothness of the video; and 4D reflectance fields that capture surface reflectance properties as a function of the angle of the incident light.

In another preferred embodiment, the present invention is a method for estimating parameters of interest directly from CS measurements of video/data sequences. Such parameters enable detection of abnormal behavior; classification and clustering of events directly from the compressive measurements without ever reconstructing the actual videos. This purposive nature of the present invention allows for reduced processing complexity as well as reduced sensing requirements.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

3 BRIEF DESCRIPTION OF THE DRAWINGS

For a more complete understanding of the present invention and the advantages thereof, reference is now made to the following description and the accompanying drawings, in which:

FIG. 1 is a diagram outlining the details of a sequence of steps detailing the two-step measurement process, and the recovery of the state sequence using singular value decomposition (SVD) and the observation matrix using a model-based CoSAMP algorithm in accordance with a preferred embodiment of the present invention.

Figure 2:
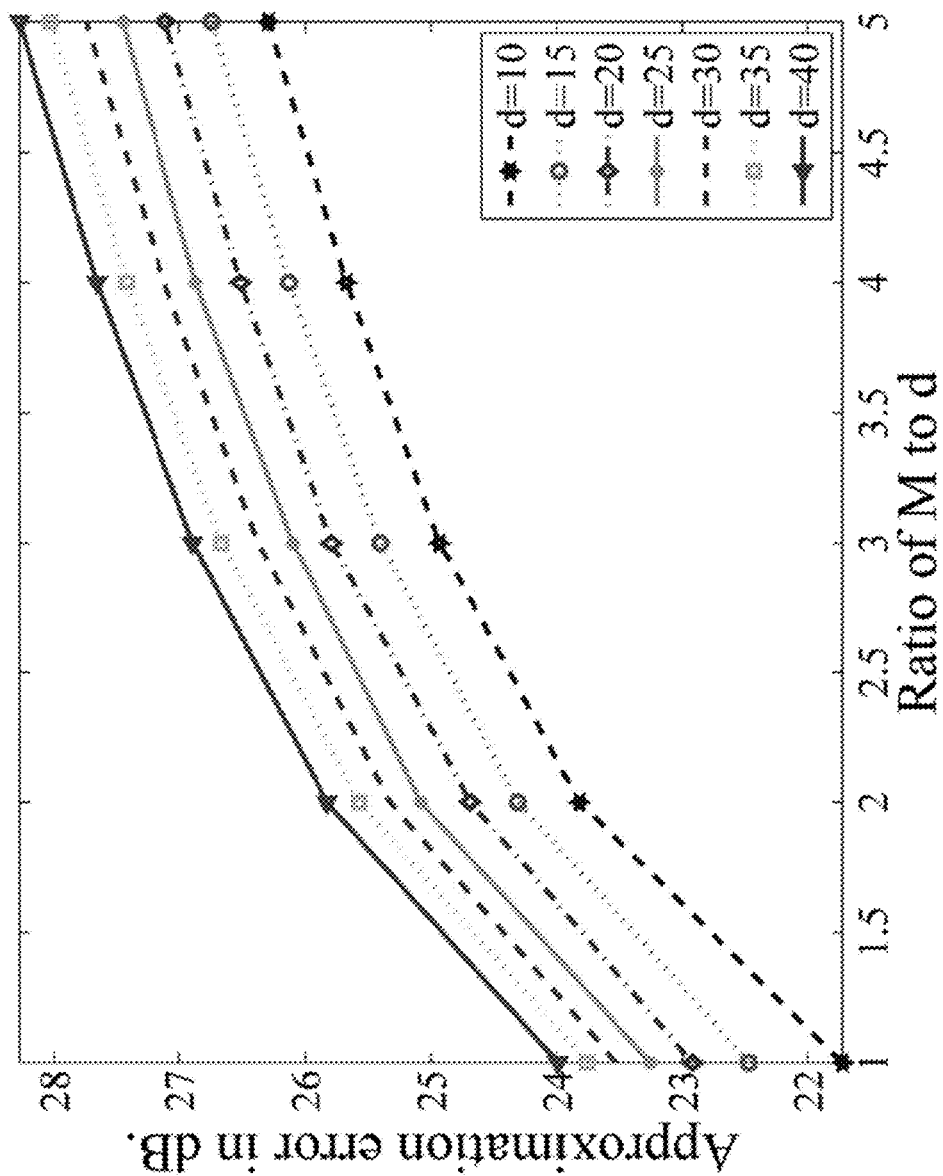

FIG. 2 is a graph showing the average error in estimating the state sequence from common measurements for various values of state dimension d and the ratio $\tilde{M}/d$. Statistics were computed using 114 videos of 250 frames, taken from the DynTex database (see R. Péteri, S. Fazekas, and M. Huiskes, "DynTex: A Comprehensive Database of Dynamic Textures," URL: http://projects.cwi.nl/dyntex/) in accordance with a preferred embodiment of the present invention.

Figure 3:
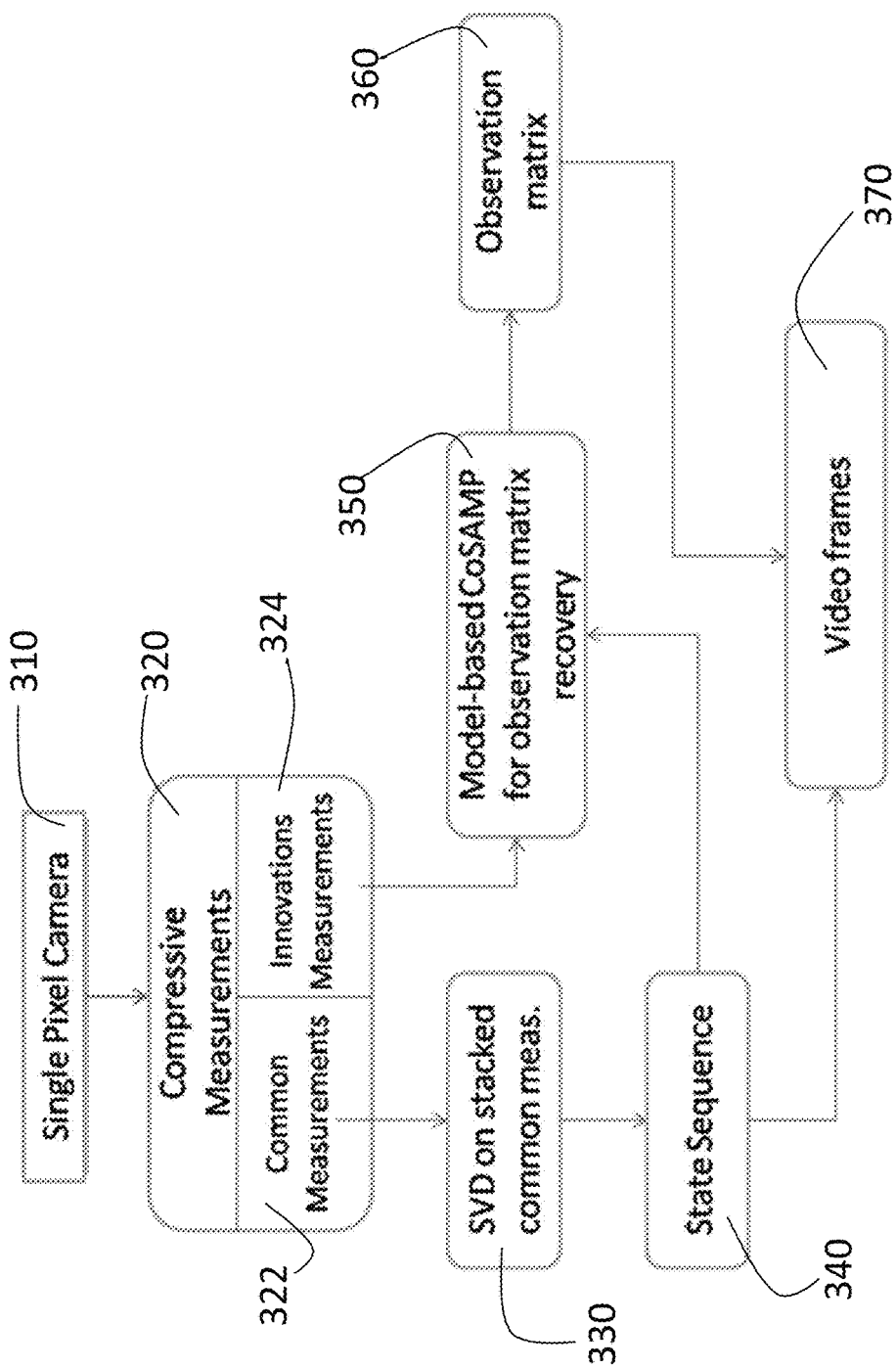

FIG. 3 is a flow diagram showing the steps involved in reconstructing the frames of a video from compressive measurements from a single pixel camera.

Figures 4A, 4B:
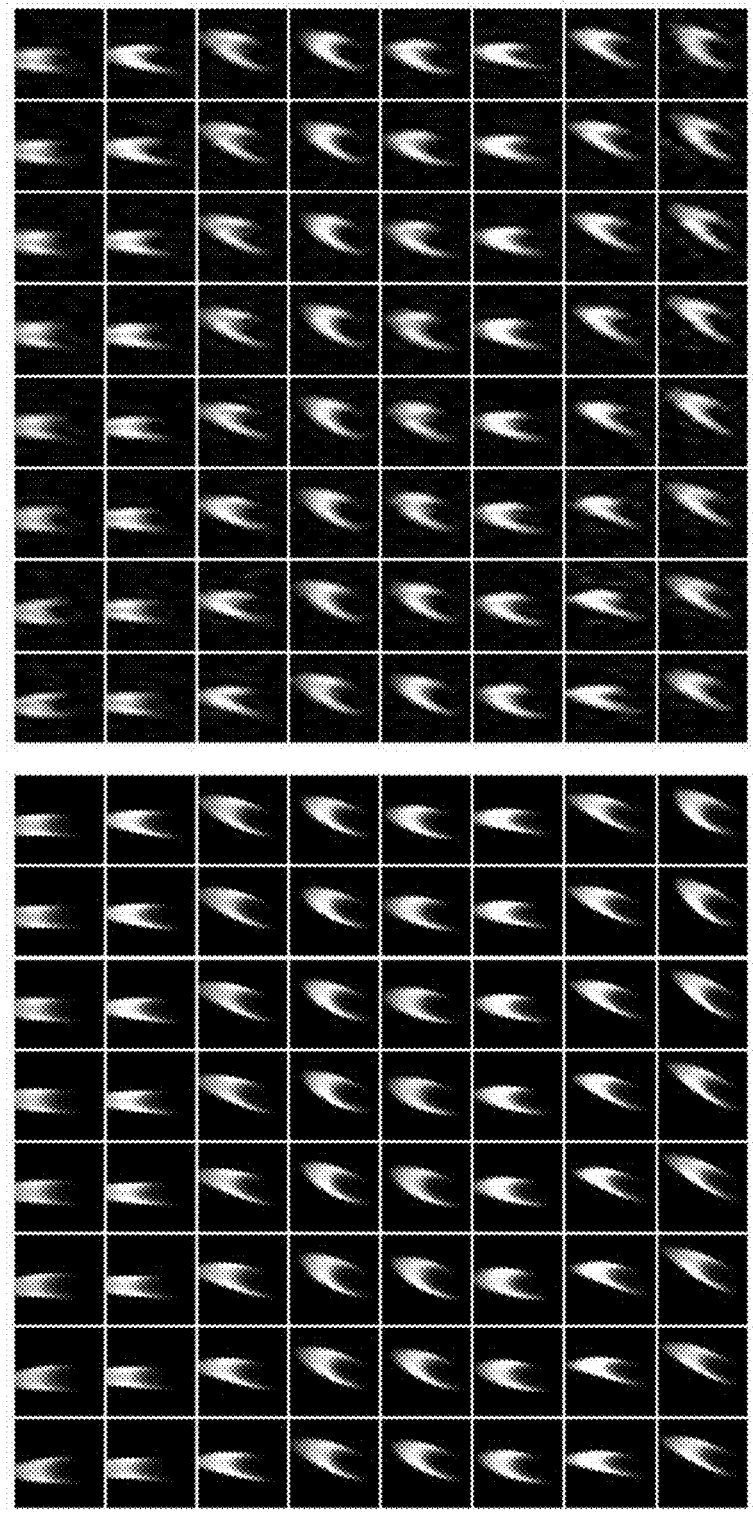
Figure 5A:
Figure 5B:
Figure 5C:
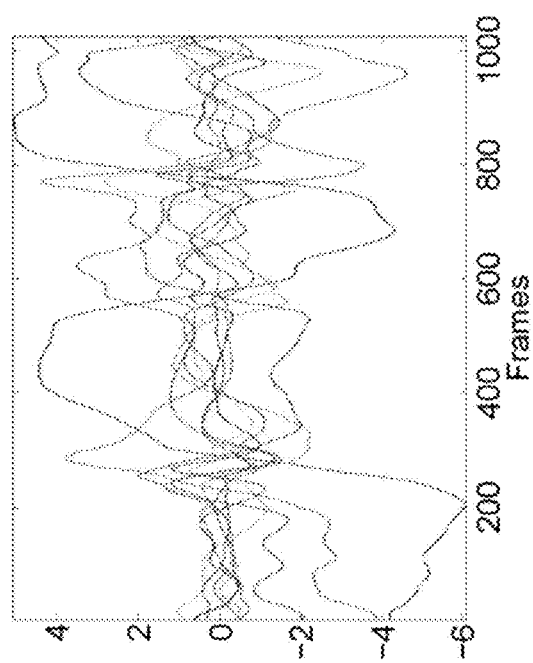
Figure 5D:
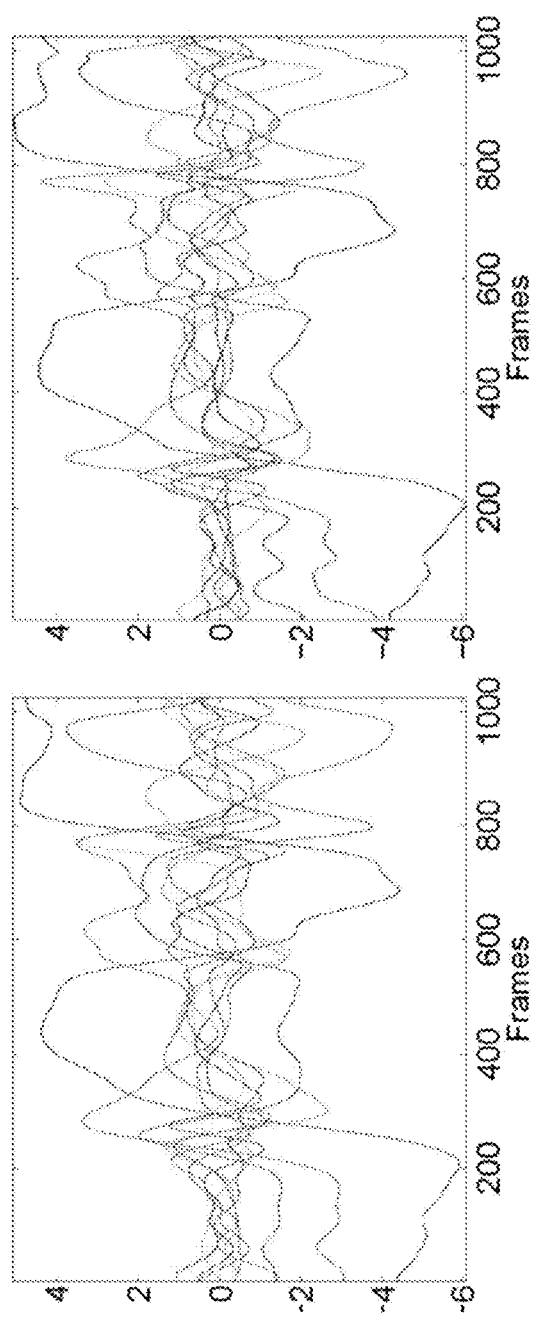

FIGS. 4A and 4B show a reconstruction result of T=1024 frames of a scene of resolution N=64×64 pixels shown as a mosaic. The original data was collected using a high speed camera operating at 1000 fps. Compressive measurements were obtained with M=30 and $\tilde{M}$=20, thereby giving a measurement rate M/N=1.2%. Reconstruction was performed under a d=15 dimensional LDS and with K=150.

FIGS. 5A-5D illustrate a reconstruction result that shows ground truth and estimated parameters corresponding to FIGS. 4A-4B. Shown are the top 10 columns of the observation matrix and state sequences. Matlab's "jet" colormap (red=+large and blue=−large) is used in FIGS. 5A and 5B.

Figure 6A:
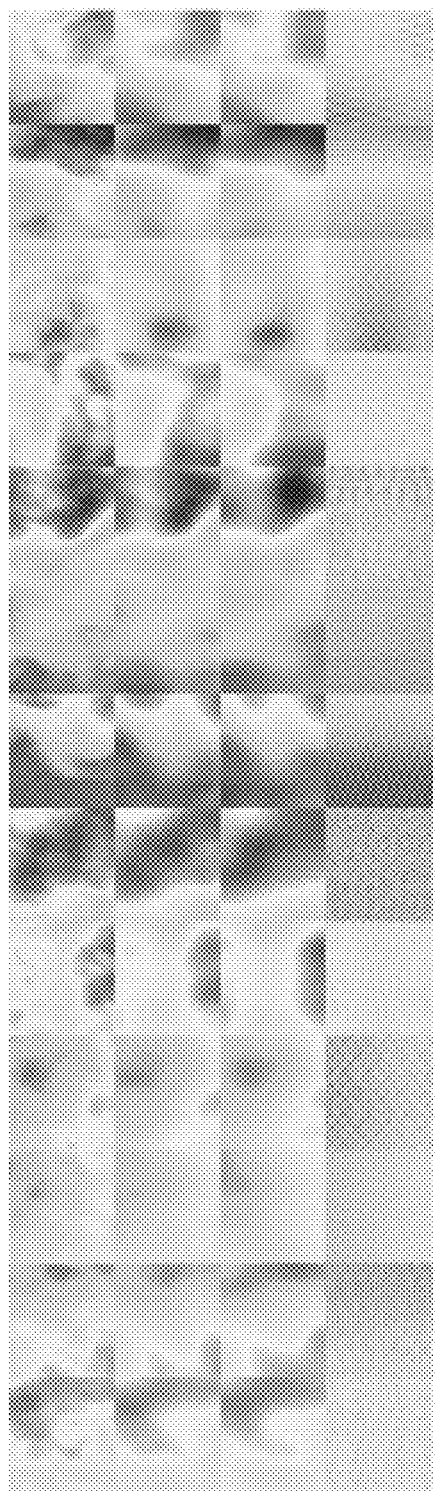
Figure 6B:
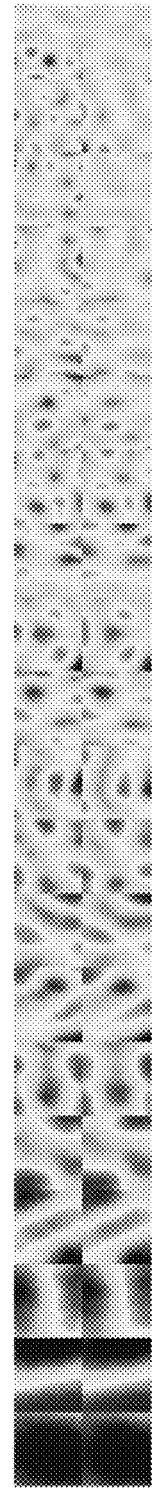

FIGS. 6A and 6B show qualitative comparisons for various reconstruction algorithms for a fire texture of length 250 frames and resolution of N=128×128 pixels. The algorithms compared are: Oracle LDS, which refers to the best d-dimensional LDS model approximating the ground truth; frame-to-frame CS, which refers to applying CS reconstruction algorithms such as CoSAMP or basis on a frame to frame basis. Compressive measurements were obtained at $\tilde{M}$=30 and $\tilde{M}$=40 measurements per frame, there by giving a measurement rate of 0.42% of Nyquist. Reconstruction was performed under a d=20 dimensional LDS and with K=30. Frames of the videos are shown in false-color for better contrast.

Figure 7:
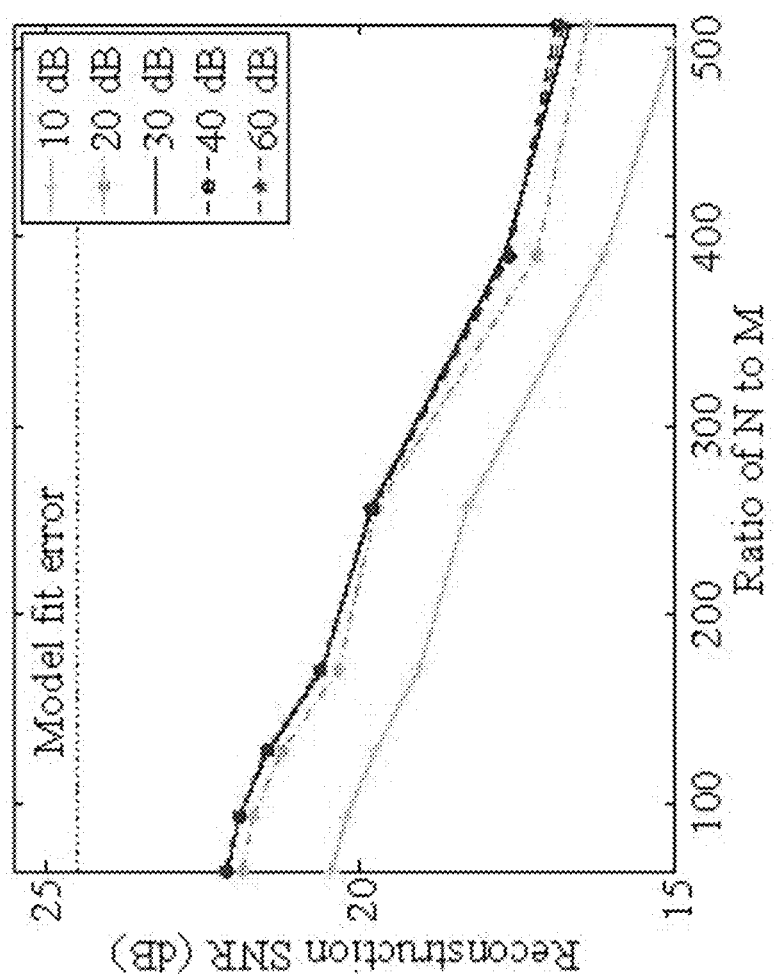

FIG. 7 is a graph that shows the reconstruction SNR at various levels of additive measurement noise. The numbers for the graph were computed using 32 Monte-Carlo simulations. The "black-dotted" line shows the reconstruction SNR for an d=20 oracle LDS. The dynamic texture of FIG. 6 was used for this result.

Figure 8A:
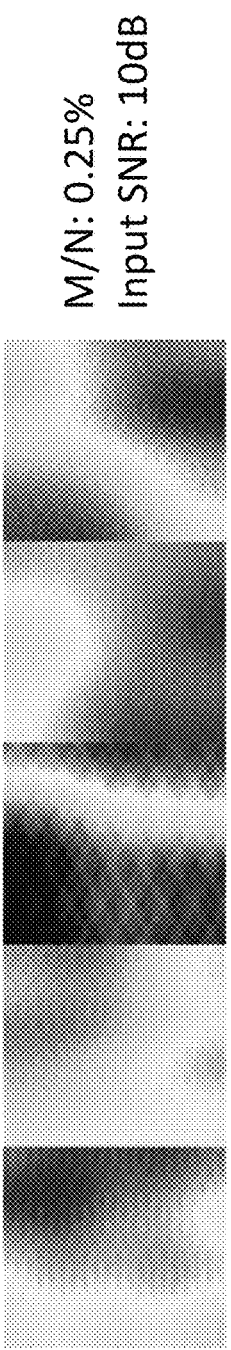
Figure 8B:
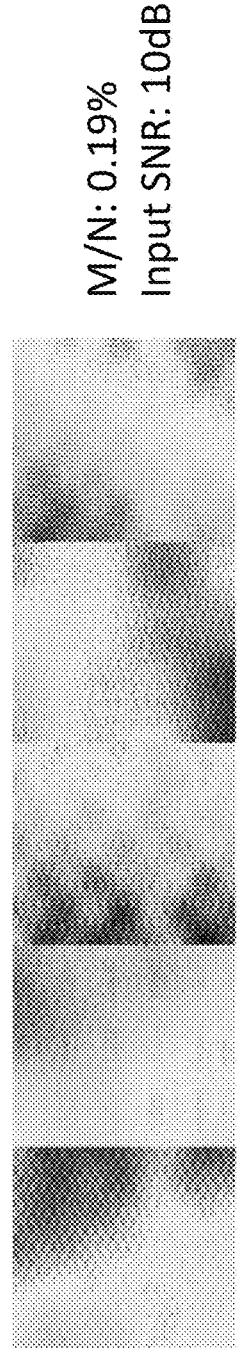
Figure 8C:
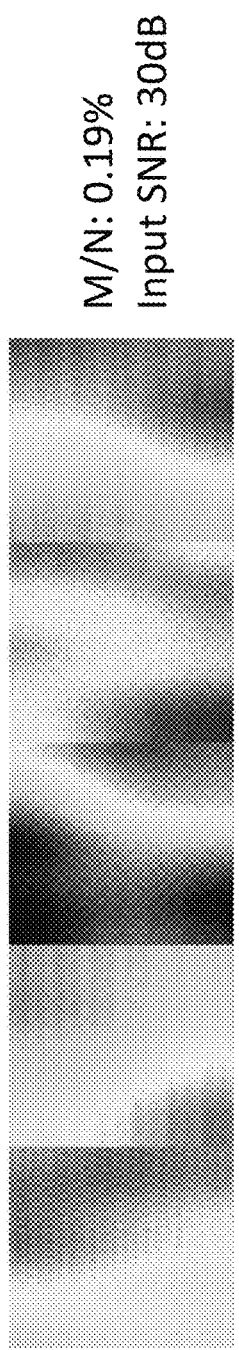

FIGS. 8A-8C encapsulate snapshots of reconstructed video frames at various operating points of FIG. 7.

FIGS. 9A-9C demonstrate the reconstruction performance for different sampling rates of a video. As the sampling frequency $f_s$ increases, we can continue to maintain the same reconstruction capabilities for significantly lesser number of measurements. Shown are reconstructions for N=64×64 and various sampling frequencies, achieved measurement rates, and reconstruction SNRs.

FIGS. 10A-10G show the reconstruction of a sequence of length 500 frames and resolution of N=64×64 pixels from the DynTex dynamic textures database. Compressive measurements were obtained at $\tilde{M}$=20 and $\tilde{M}$=70 measurements per frame, there by giving a measurement rate of M/N=2.2%. Reconstruction was performed under a d=7 dimensional LDS and with K=200.

4 DETAILED DESCRIPTION OF THE PREFERRED EMBODIMENTS

The following notation is used in the present description. At time/frame t, the image observation is $y_t \in \mathbb{R}^N$, the hidden state is $x_t \in \mathbb{R}^d$, such that $y_t = Cx_t$, where $C \in \mathbb{R}^{N \times d}$ is the observation matrix. In this description z is used to denote compressive measurements and $\Phi$ and $\Psi$ to denote measurement and sparsifying matrices respectively.

Further, ":" subscripts are used to denote sequences, such as $x_{1:T} = \{x_1, x_2, \ldots, x_T\}$, and the $[\bullet]_{1:T}$ to denote matrices, such as $[y]_{1:T}$ is the N×T matrix formed by $y_{1:T}$ such that the k-th column is $y_k$.

One of the key features of an LDS is that the observations $y_t$ lie in the subspace spanned by the columns of the matrix C. The subspace spanned by C also forms a static parameter of the system. Estimating C and the dynamics encoded in the state sequence, $x_{1:T}$ is sufficient for reconstructing the video. For most LDSs, N≫d, thereby making C much higher dimensional than the state sequence $\{x_t\}$. In this sense, the LDS models the video using high information rate static parameters (such as C) and low information rate dynamic components (such as $x_t$). This relates to an initial motivation for identifying signal models with parameters that are largely static. The subspace spanned by C is static, and hence, we can "pool" measurements over time to recover C.

Further, given that the observations are sparse in a wavelet/Fourier basis, one can argue that the columns of the C need to be sparse as well in a similar wavelet basis. Sparsity of C is also motivated by the fact that columns of C encodes the dominant motion in the scene, and for a large set of videos, this is smooth and has sparse representation in a wavelet/DCT basis or in a dictionary learnt from training data. This sparsity can be exploited along the lines of the theory of CS. However, note that $y_t = Cx_t$ is a bilinear relationship in C and $x_t$, which complicates direct inference of the unknowns. Towards alleviating this non-linearity, the present invention employs a two-step measurement process that enables the estimation of the state $x_t$ first and subsequently the solution for C. This is referred to in this description as the CS-LDS framework.

4.1 Outline of the CS-LDS Framework

As shown in FIG. 3, at each time instant t, two sets of measurements 322, 324 are taken by aggregating consecutive measurements from a single pixel camera, or SPC, 310. The scene is assumed to be quasi-stationary over small time durations, which allows us to assume that the consecutive measurements of the SPC are from near-identical scenes.

$$z_t = \begin{pmatrix} \check{z}_t \\ \tilde{z}_t \end{pmatrix} = \begin{bmatrix} \check{\Phi} \\ \tilde{\Phi}_t \end{bmatrix} y_t = \Phi_t y_t, \quad (4)$$

where $\check{z}_t \in \mathbb{R}^{\check{M}}$ and $\tilde{z}_t \in \mathbb{R}^{\tilde{M}}$, such that the measurement rate at each frame is $M = \check{M} + \tilde{M}$. We denote $\check{z}_t$ as common measurements 322 in the sense that the corresponding measurement matrix $\check{\Phi}$ it is the same at each time instant. We denote $\tilde{z}$ as innovations measurements. For the innovations measurements 324, the measurement matrix is different at each time instant. The state sequence 340 can be estimated up to a linear transformation using an singular value decomposition (SVD) of the common measurements $$[\check{z}]_{1:T} = [\check{z}_1 \, \check{z}_2 \ldots \check{z}_T] = \check{\Phi}C[x_1 \, x_2 \ldots x_T] = \check{\Phi}C[x]_{1:T}. \quad (5)$$

The state sequence 340 is recovered using singular value decomposition (SVD) 330 and the observation matrix 360 using a model-based CoSAMP algorithm 360. Hence, an SVD 330 of $[\check{z}]_{1:T} = USV^T$ allows us to identify $[x]_{1:T}$ up to a linear transformation. In particular, the columns of V corresponding to the top d singular values form an estimate of $[x]_{1:T}$ up to a d×d linear transformation (the ambiguity being the choice of coordinate). When the video sequence 370 is exactly an LDS of d dimensions, this estimate is exact provided $\check{M} > d$. The estimate can be very accurate, when the video sequence is approximated by a d-dimensional subspace as discussed later in this section. Once we have an estimate of the state sequence 340, say $[\hat{x}]_{1:T}$, we can obtain C by solving the following convex problem:

$$(P1) \min \sum_{k=1}^{d} \|\Psi^T c_k\|_1, \text{ subject to } \|z_t - \Phi_t C\hat{x}_t\|_2 \leq \epsilon, \forall t \quad (6)$$

where $c_k$ is the k-th column of the matrix C, and Ψ is a sparsifying basis for the columns of C. In this context, we have the freedom of choosing a different basis for each column of C. In Section 4.3, we show that the specifics of our measurements induce a structured sparsity in the columns of C, and this naturally leads to an efficient greedy solution.

Note that we do not require $\check{\Phi}$ and $\tilde{\Phi}$ to be a random matrix. Along the lines of the CS, we only require them to be incoherent with the sparsifying (or compressible) basis. In many cases, there exist fast random transforms, such as noiselets and permuted Hadamard that are incoherent with Wavelet bases. These are especially useful in large scale problems where it becomes difficult to store Φ explicitly as a matrix.

An exemplary preferred embodiment of the present invention is described with reference to FIG. 1. A CS camera 120 performs a two-step measurement process with respect to image 110. The proposed invention can work with a CS camera similar to the single pixel camera (U.S. Patent Publication No. 2006/0239336) with a processor, a memory, a single photo-diode and a programmable micro-mirror array for acquiring random projections of the incident lightfield. The CS camera takes common measurements 122 and innovations measurements 124. This enables us to image at arbitrary wavelengths by choosing appropriate photodiodes tuned to the spectrum of interest. Finally, the programmable nature of the micro-mirror array allows for arbitrary measurement matrices as required in (4). This allows for the estimation of the state sequence 140 using just the common measurements 122, and subsequently, solving for C using the diversity present in the innovations measurements $[\tilde{z}]_t$. Recovery of the state sequence using singular value decomposition (SVD) 150 and the observation matrix using a model-based CoSAMP algorithm 130.

4.2 Low-Dimensional Projections of LDS Data

As mentioned earlier, when $[y]_{1:T}$ lies exactly in the (column) span of a matrix C, then $[\check{z}]_{1:T}$ lies in the span of $\check{\Phi}C$. Hence, the SVD of $[\check{z}]_{1:T}$ can be used to recover the state sequence up to a linear transformation, provided $\check{M} \geq d$ $$[\check{z}]_{1:T} = USV^T, \quad [\hat{x}]_{1:T} = S_d V_d^T \quad (7)$$

where $S_d$ is the d×d principal sub-matrix of S and $V_d$ is the T×d matrix formed by columns of V corresponding to the largest d singular values. In practice, the observations $y_t$ lie close to the subspace spanned by C such that projection of onto C makes for a highly accurate approximation of $y_t$. In such a case, the estimate of the state sequence from the SVD of $[\check{z}]_{1:T}$ is accurate only when the observations $y_t$ are compressible (see J. Fowler, "Compressive-projection principal component analysis," in *IEEE Transactions on Image Processing* vol. 18 (2009)). In our case, this is equivalent to imposing a power-law decay on the singular values.

FIG. 2 shows the accuracy of the approximation of the estimated state sequence for various values of $\check{M}$. This suggests that, in practice, $x_t$ can be reliably estimated with $\check{M} \propto d$.

4.3 Structured Sparsity and Recovery with Modified CoSAMP

The SVD of the common compressive measurements introduces an ambiguity in the estimates of the state sequence in the form of $[\hat{x}]_{1:T} \approx L^{-1}[x]_{1:T}$, where L is an invertible d×d matrix. Solving (P1) using this estimate will, at best, lead to an estimate $\hat{C}=CL$, satisfying $z_t=\Phi_t\hat{C}\hat{x}_t$. This ambiguity introduces additional concerns in the estimation of C. Suppose the columns of C are K-sparse each in $\Psi$ with support $S_k$ for the k-th column. Then, the columns of CL are potentially dK-sparse with identical supports $S=\cup_k S_k$. The support is exactly dK-sparse when the $S_k$ are disjoint and L is dense. At first glance, this seems to be a significant drawback, since the overall sparsity of $\hat{C}$ has increased to $d^2K$. However, this apparent increase in sparsity is alleviated by the columns having identical supports. The property of identical supports on the columns of CL can be exploited to solve (P1) very efficiently using greedy methods.

Given the state sequence, we use a modified CoSAMP algorithm for estimating C. The modification exploits the structured sparsity induced by the columns of C having identical support. In this regard, the resulting algorithm is a particular instance of the model-based CoSAMP algorithm (see R. G. Baraniuk, V. Cevher, M. F. Duarte and C. Hegde, "Model-based compressive sensing," *CoRR* vol. abs/0808.3572 (2008)). One of the key properties of model-based CoSAMP is in signal recovery from a number of measurements that is proportional the model-sparsity of the signal, which in our case is equal to dK. Hence, we can recover the observation matrix from just O(dK log(Nd)) measurements. The modified CoSAMP algorithm used for recovering the observation matrix is summarized below.

In addition to this, the performance guarantees provided by CoSAMP (and model-based CoSAMP) extend gracefully to compressible (and model-compressible) signals (see J. Haupt, and R. Nowak, "Signal reconstruction from noisy random projections," *IEEE Transactions on Information Theory*, vol. 52 (2006) 4036-4048; R. G. Baraniuk, V. Cevher, M. E Duarte and C. Hegde, "Model-based compressive sensing," *CoRR* vol. abs/0808.3572 (2008)). This gives us reconstructions with errors proportional to the model fit error.

$\hat{C}$ = CoSaMP_Common_Sparsity($\Psi$, K, $z_t$, $\hat{x}_t$, $\Phi_t$, t = 1, . . . , T)
Notation:
supp(vec; K) returns the support of K largest elements of vec
$A_{|\Omega,\cdot}$ represents the submatrix of A with rows indexed by $\Omega$ and all columns.
$A_{|\cdot,\Omega}$ represents the submatrix of A with columns indexed by $\Omega$ and all rows.
$\forall t, \theta_t \leftarrow \Phi_t\Psi$
$\forall t, v_t \leftarrow 0 \in \mathbb{R}^M$
$\Omega_{old} \leftarrow \phi$
While (stopping conditions are not met)
  $R = \Sigma_t \theta_t^T v_t \hat{x}_t^T$ $\quad$ ($R \in \mathbb{R}^{N \times d}$)
  $k \in [1, \ldots, N], r(k) = \Sigma_{i=1}^d R^2(k, i)$ $\quad$ ($r \in \mathbb{R}^N$)
  $\Omega \leftarrow \Omega_{old} \cup \text{supp}(r; 2K)$
  Find $A \in \mathbb{R}^{|\Omega| \times d}$ that minimizes $\Sigma_t \|z_t - (\theta_t)_{|\cdot,\Omega}A\hat{x}_t\|_2$
  $B_{|\Omega,\cdot} \leftarrow A$
  $B_{|\Omega_c,\cdot} \leftarrow 0$
  $k \in [1, \ldots, N], b(k) = \Sigma_{i=1}^d B^2(k, i)$ $\quad$ ($b \in \mathbb{R}^N$)
  $\Omega \leftarrow \text{supp}(b; K)$ $S_{|\Omega,\cdot} \leftarrow B_{|\Omega,\cdot}$ $\quad$ $S_{|\Omega_c,\cdot} \leftarrow 0$
$\Omega_{old} \leftarrow \Omega$
$\hat{C} \leftarrow \Psi B$
$\forall t, v_t \leftarrow z_t - \theta_t S\hat{x}_t$

4.4 Performance and Measurement Rate

For a stable recovery of the observation matrix, [specify it's notation and size] we need in total O(dK log(Nd)) measurements. In addition to this, for recovering the state sequence, we need a number of common measurements proportional to the dimensionality of the state vectors $$MT \propto dK \log(Nd), \check{M} \propto d. \quad (8)$$

Compared to Nyquist sampling, we obtain a measurement rate given by $$\frac{M}{N} \propto \frac{dK\log(Nd)}{NT}. \quad (9)$$

This indicates extremely favorable operating scenarios for the CS-LDS framework, especially when T is large (as in a high frame rate capture). Consider a segment of a video of fixed duration observed at various sampling rates. The effective number of frames, T, changes with the sampling rate, $f_s$ (in frames per second), as $T \propto f_s$. However, the complexity of the video measured using the state space dimension d does not change. Hence, as the sampling rate $f_s$ increases, $\check{M}$ can be decreased while keeping the value of M $f_s$ constant. This will ensure that (8) is satisfied, allowing a stable recovery of C. This suggests that as the sampling rate increases our measurement rate decreases, a very desirable property for high-speed imaging.

4.5 Extensions

4.5.1 Mean+LDS

In many instances, a dynamical scene is modeled better as an LDS over a static scene, that is, $y_t=Cx_t+\mu$. This can be handled with two minimal modifications to the algorithm described above. There are two modifications. First, the state sequence $[\hat{x}]_{1:T}$ is obtained by performing SVD on the matrix $[\check{z}]_{1:T}$ modified such that the each row sums to zero. This works under the assumption that the sample mean of $\check{z}_{1:T}$ is equal to $\check{\Phi}_\mu$, the compressive measurement of $\mu$. Next, we use model-based CoSAMP to estimate both C and $\mu$ simultaneously. However, only the columns of C enjoy the structured sparsity model. The support of $\mu$ is not constrained to be similar to that of C.

4.5.2 Residual Correction

When we work with large number of measurements per time instant, we can perform residual recovery on each frame of the video separately. Given estimates of the observation matrix $\hat{C}$ and the state sequence $\hat{x}_{1:T}$, we can perform an $l_1$ recovery on the residue at each frame:

$$(P_t)\hat{s}_t = \arg\min\|\Psi s_t\|_1 \text{ subject to } \|z_t - \Psi_t(\hat{C}\hat{x}_t + s_t)\|_2 \leq \epsilon \quad (10)$$

The new estimate of the frame is $\hat{y}_t = \hat{C}\hat{x}_t + s_t$. In practice, residual correction works only when we have a large number of measurements such that $M \gg dK \log(Nd)/T$ so that we have enough measurements to estimate beyond the support of C.

4.6 Results

We present a range of experiments validating various aspects of our proposed CS-LDS framework. Our test dataset comprises of videos from DynTex (see R. Péteri, S. Fazekas, and M. Huiskes, "DynTex: A Comprehensive Database of Dynamic Textures," URL: http://projects.cwi.nl/dyntex/) and data we collected using high speed cameras. For most experiments, we chose M=2d, with d as well as K chosen appropriately. We used the mean+LDS model for all the experiments with 2D DCT as the sparsifying basis for the columns of C as well as the mean. Finally, the entries of the measurement matrix were sampled from iid standard Gaussian distribution. We compare against frame-to-frame CS where each frame of the video is recovered separately using traditional CS. We use the term oracle LDS for parameters and video reconstruction obtained by operating on the original data itself. Oracle LDS estimates the parameters using a rank-d approximation to the ground truth data. The reconstruction SNR of the oracle LDS gives an upper bound on achievable SNR. Finally, the ambiguity in observation matrix (due to non-uniqueness of the SVD based factorization) as estimated by oracle LDS and CS-LDS is resolved for visual comparison in FIGS. 5 and 6.

Reconstruction:

FIG. 4 shows reconstruction results from data collected from a high speed camera of a candle flame. FIG. 5 shows the estimated observation matrix as well as the state sequence. FIG. 6 shows video reconstruction of a dynamic texture from the DynTex dataset (see R. Péteri, S. Fazekas, and M. Huiskes, "DynTex: A Comprehensive Database of Dynamic Textures," URL: http://projects.cwi.nl/dyntex/). The original video was 250 frames long. Reconstruction results are under a measurement rate M/N=1/234 (about 0.25%), an operating point where a frame-to-frame CS recovery is completely infeasible. However, the dynamic component of the scene is relatively small (d=20) which allows us to recover the video from relatively few measurements. The SNR of the reconstructions shown are as follows: Oracle LDS=24.97 dB, frame-to-frame CS: 11.75 dB and CS-LDS: 22.08 dB. This also demonstrates the robustness of CS-LDS to model error.

Performance with Measurement Noise:

It is worth noting that the video sequences used in the experiments have moderate model fit error at a given value of d. The columns of C with larger singular values are, inherently, better conditioned to deal with this model error. The columns corresponding to the smaller singular values are invariably estimated at higher error. This is reflected in the estimates of the C matrix in FIGS. 5 and 6.

FIG. 8 shows the performance of the recovery algorithm for various levels of measurement noise. The effect of the measurement noise on the reconstructions is perceived only at much lower SNR. This is, in part, due to the model fit error dominating the performance of the algorithm when the measurement noise SNR is very high. As the measurement SNR drops significantly below the model fit error, predictably, it starts influencing the reconstructions more. This "property" provides a certain amount of flexibility in the design of potential CS-LDS cameras especially in purposive imaging scenarios, Sampling Rate:

FIG. 9 shows reconstruction plots of the candle sequence (of FIG. 4) for 1 second of video at various sampling rates. We use (9) to predict the required measurement rates at various sampling rates to maintain a constant reconstruction SNR. As expected, the reconstruction SNR remains the same, while the measurement rate decreases significantly with a linear increase in the sampling rate. This makes the CS-LDS framework extremely promising for high speed capture applications. In contrast, most existing video CS algorithms have measurement rates that, at best, remain constant as the sampling rate increases.

4.7 Application to Non-LDS Data

While the above formulation concentrates mainly on LDSs, the overall framework of sensing extended the important class of subspace compressible data. The CS-LDS framework of two-step sensing followed by SVD to recover subspace coefficients (or the state vectors) and model-based CoSAMP for recovering a basis spanning the subspace itself. This basic framework is applicable to data that is compressible onto an unknown subspace. There are many examples of data exhibiting such behavior. In particular, any correlated data exhibits this property.

Hyper-spectral data is potentially one example where this model for sensing can be applied. Images corresponding to different spectral bands are correlated for two reasons; spectral characteristics of materials in neighboring frequency bands typically similar and, the sensed spectrum typically overlaps significantly for different bands. This makes hyper-spectral data an important application domain for the proposed invention.

Linear dynamical evolution is invariably accurate over small time durations and use of high-speed sensors (such as photo-diodes) reduces this modeling error as well as provide sufficient number of measurements for stable reconstructions. In this regard, the proposed invention can also be applied for non-image temporal data such as time varying reflectance fields and time varying BRDFs.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method comprising the steps of:
   capturing a video sequence, wherein the step of capturing a video sequence comprises taking two sets of measurements at each of a plurality of time instants and aggregating consecutive measurements wherein:
     a first of said two sets of measurements at particular time instant comprises common measurements for which a corresponding measurement matrix is that same at both said particular time instant and an immediately preceding time instant; and
     a second of said two sets of measurements at said particular time instant comprises innovation measurements for which a corresponding measurement matrix is different than a measurement matrix corresponding to innovation measurements at said immediately preceding time instant; and
   estimating a state sequence up to a linear transformation using a singular value decomposition of only said common measurements.

2. A method according to claim 1, wherein said step of capturing a video sequence further comprises the step of estimating an observation matrix using said innovation measurements.

3. A method according to claim 2, further comprising the step of recovering an estimate of said video sequence from a product of said observation matrix and said state sequence.

4. A method according to claim 1, wherein said step of capturing a video sequence further comprises:
using a compressive sensing camera to obtain said common measurements and said innovations measurement, wherein said compressive sensing camera comprises a processor, a memory, a single photo-diode and a programmable micro-mirror array for acquiring random projections of a light field incident to a scene.

5. A method according to claim 1, wherein said step of estimating a state sequence comprises using a singular value decomposition of said common measurements wherein said measurement matrix is modified to make each row in said matrix sum to zero.

6. A method for sensing multiple frames of data that lies on an unknown, low dimensional subspace using common and innovations measurements comprising the steps of:
obtaining common measurements of said multiple frames of data, wherein for said common measurements a corresponding measurement matrix is the same at each time instant;
obtaining innovations measurements of said multiple frames of data, wherein for said innovation measurements a corresponding measurement matrix is different at each time instant; and
estimating a state sequence up to a linear transformation using a singular value decomposition of only said common measurements;
wherein said step of estimating a state sequence comprises using a singular value decomposition of said common measurements wherein said measurement matrix is modified to make each row in said matrix sum to zero.

7. A method for sensing multiple frames of data that lies on an unknown, low dimensional subspace using common and innovations measurements according to claim 6, wherein said data comprises hyper-spectral data with multiple frequency sensing bands with high correlation between these frequency band.

8. A method for sensing multiple frames of data that lies on an unknown, low dimensional subspace using common and innovations measurements according to claim 6, wherein said data comprises a reflectance field of a scene where pixels with similar texture exhibit similar reflectance properties.

9. A method for sensing multiple frames of data that lies on an unknown, low dimensional subspace using common and innovations measurements according to claim 6, wherein said data comprises time varying hyper-spectral data that exhibits spectral correlation as well as temporal correlation permitting subspace model for various spectral bands and linear dynamical system modeling for temporal variations.

* * * * *